United States Patent [19]

Spaltofski

[11] Patent Number: 5,108,077

[45] Date of Patent: Apr. 28, 1992

[54] RESILIENT ALVEOLAR BLOCK FOR FILTERING VIBRATIONS, INTENDED MORE PARTICULARLY FOR SUPPORTING AN ENGINE-GEAR BOX UNIT IN A VEHICLE

[75] Inventor: Ralf Spaltofski, Ludwigshafen, Fed. Rep. of Germany

[73] Assignee: Paulstra GmbH, Mannheim, Fed. Rep. of Germany

[21] Appl. No.: 657,762

[22] Filed: Feb. 21, 1991

[30] Foreign Application Priority Data

Feb. 26, 1990 [FR] France ............................ 90 02349

[51] Int. Cl.⁵ .......................... F16F 1/36; B60G 11/22
[52] U.S. Cl. .................................... 267/153; 267/145; 267/292; 248/621; 248/638
[58] Field of Search ............ 267/136, 140.1 R, 140.5, 267/141, 141.2, 145, 153, 189, 201, 279, 292, 293; 464/180, 181; 248/638, 621, 609, 580, 634, 562, 615

[56] References Cited

U.S. PATENT DOCUMENTS

| | | | |
|---|---|---|---|
| 2,058,623 | 10/1936 | Protzeller et al. | 267/294 |
| 2,113,372 | 5/1938 | Ellies | 267/294 |
| 4,750,720 | 6/1988 | Wolf et al. | 267/292 X |
| 4,776,573 | 10/1988 | Wolf et al. | 267/153 X |
| 4,925,163 | 5/1990 | Wolf et al. | 267/153 |

FOREIGN PATENT DOCUMENTS 0110233  6/1984  European Pat. Off. ............ 267/141

*Primary Examiner*—Matthew C. Graham
*Assistant Examiner*—Josie A. Ballato
*Attorney, Agent, or Firm*—Larson & Taylor

[57] ABSTRACT

A resilient alveolar block is provided for filtering vibrations, intended particularly to support an engine-gear box unit in a vehicle, wherein, in a rubber or elastomer block (1) cells (4, 5) are provided capable of communicating with the outside through passages for the moulding cores (respectively 2 and 3), the purpose of these cells being to obtain a very low constant stiffness of the block. The cells and their respective passages are distributed in identical superimposed layers, with two adjacent layers being offset by 90° through rotation about the axis of the block so that, seen in projection, the spherical cells may be narrowly interleaved.

4 Claims, 3 Drawing Sheets

RESILIENT ALVEOLAR BLOCK FOR FILTERING VIBRATIONS, INTENDED MORE PARTICULARLY FOR SUPPORTING AN ENGINE-GEAR BOX UNIT IN A VEHICLE

The present invention relates to a resilient alveolar block for filtering vibrations, intended more particularly for supporting an engine-gear box unit in a vehicle, this block, having a general cylindrical shape, being made from rubber or elastomer and comprising in its mass a certain number of cells, spherical for example, those of these cells which extend in the same plane transversal to the axis of the block being connected together by passages for the moulding cores, these passages opening into the lateral wall of the block and being stepped in successive layers so that they do not pass through each other.

The purpose of known filtering blocks of this type is to damp out the vibrations which may be transmitted from the engine-gear box unit to the vehicle. The purpose of the cells is to confer a great flexibility on the block, without the danger of creeping and with a stiffness as constant as possible depending on the load. The cells further have a role, by themselves, of noise dampers.

In a known filtering block of this type, the passages in question are disposed in crossed layers, i.e. in projection on a plane perpendicular to the axis of the block, they appear as forming crosses situated between the cells.

This configuration results from the fact that all the passages of the same layer extend in one and the same direction over the whole of their length, whereas all the passages of the immediately following layer all extend in one and the same direction which is perpendicular to the preceding one, and so on.

When the assembly of cells is observed in a projection on a plane perpendicular to the axis of the block, it can be seen that they leave therebetween considerable masses of solid rubber. The block has therefore a reduced homogeneity.

Another drawback of such a block resides in the fact that it requires joint planes of complex shape for the mould; in fact, if one and the same quarter of the block is observed, it can be seen that said passages of the successive layers open to the outside in two directions alternately perpendicular to each other. No quarter of the block can be found in which they all open to the outside in the same direction. Since the block is moulded in four quarters, it can then be seen that the mould quarters cannot have a joint plane of linear shape; the joint plane has a crenellated shape.

The object of the present invention is to overcome these drawbacks of the prior art and in particular to provide a filtering block of the general type defined at the beginning but having a larger number of cells for the same total volume of the block, a better homogeneity as to the distribution of these cells in the block and finally simplifying the shape of the joint planes of the mould.

To this end, a resilient alveolar block in accordance with the invention is characterized in that in one and the same layer the first parallel passages which open to the outside on the faces of two diametrically opposite quarters of the block have the same direction, whereas the second parallel passages which open to the outside on the faces of the other two diametrically opposite quarters of the block have a direction perpendicular to the preceding one.

This arrangement readily solves the problem of the joint planes of the mould, which may then be linear. It will be better understood why from the figures.

In another advantageous arrangement of the present invention, the block may be further characterized in that said first passages have, with respect to said second passages of the same layer, an arrangement such that an imaginary rotation of 90° about the axis of the block would cause them to mutually interpenetrate, and the cells into which they open to be narrowly interleaved, and in that two immediately successive layers of the block are identical as to the arrangement of said passages and said cells but are offset with respect to each other (in projection on a plane perpendicular to the axis) by an angle of 90° through rotation about the axis of the block.

It will be understood that with this particularly advantageous arrangement, a higher cell density will be obtained and a better distribution of the cells throughout the block and this, in addition, without intersection of said passages.

That also will be made clearer by the few explanations now given with reference to the figures of the accompanying drawings in which.

In the Figures, the block is designated at 1, the first passages at 2, the second passages at 3 and the spherical cells into which passages 2 and 3 open or through which they pass respectively at 4 and 5. The axial passage of the block 1 is referenced 6.

Figure 1:
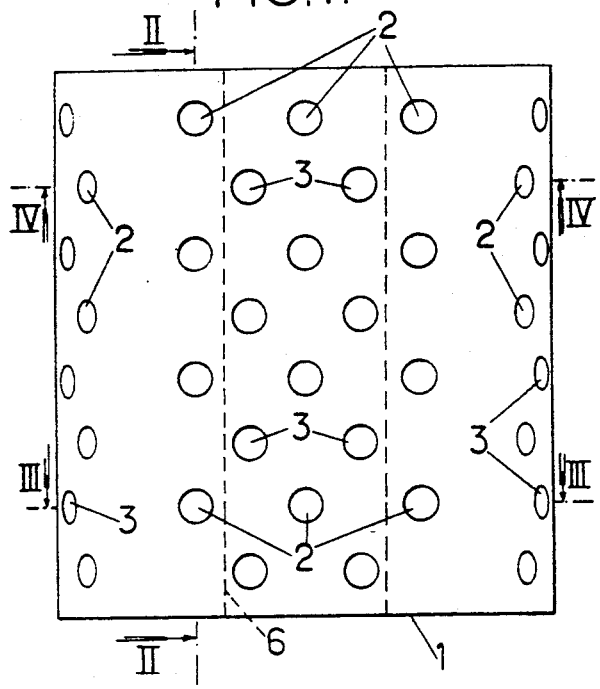
FIG. 1 is an elevational view of a filtering block in accordance with the invention.
Figure 2:
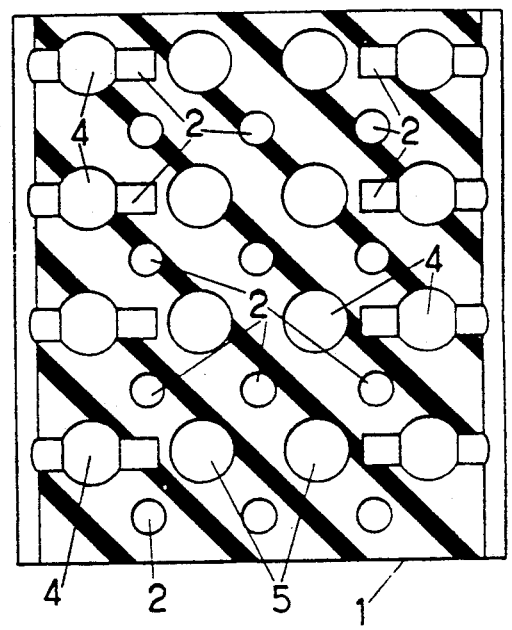
FIG. 2 is a longitudinal sectional view through line II—II of FIG. 1.
Figure 3:
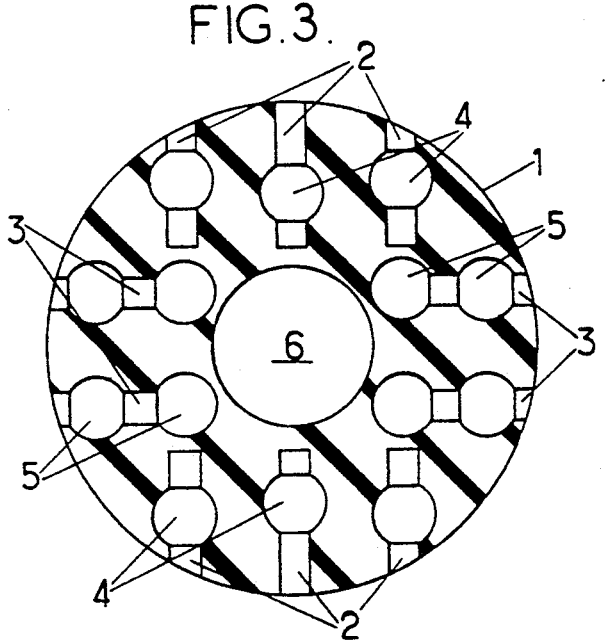
FIG. 3 is a cross sectional view through line III—III of FIG. 1.
Figure 4:
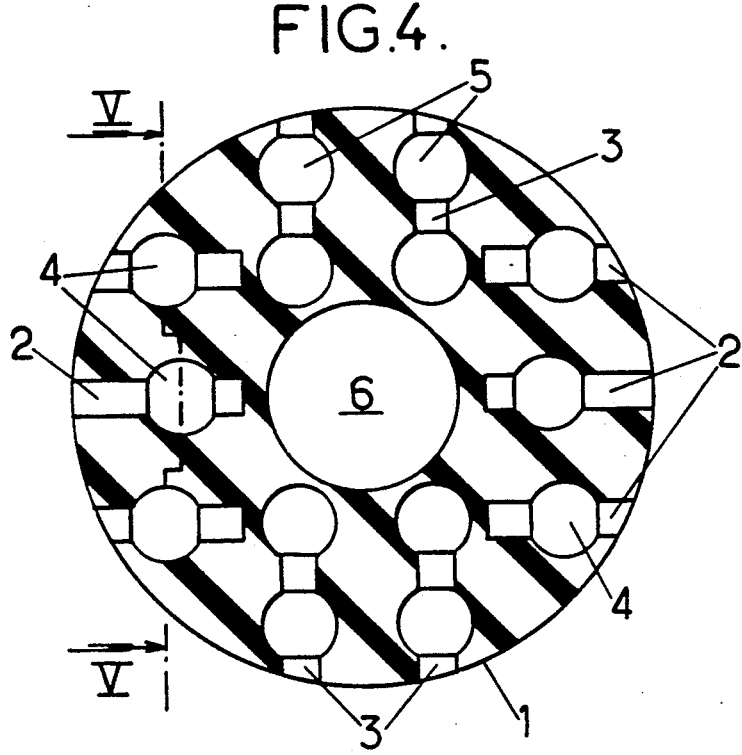
FIG. 4 is a cross sectional view through line IV—IV of FIG. 1.
Figure 5:
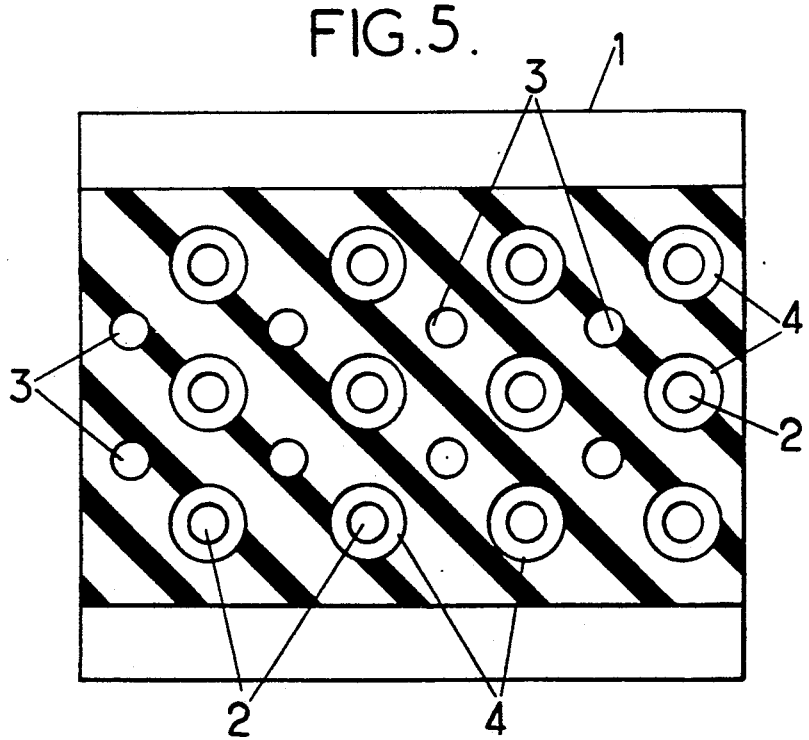
FIG. 5 is a longitudinal sectional view through line V—V of FIG. 4.

By comparing FIGS. 3 and 4 it can be seen that two consecutive layers of passages and cells of the block are identical but offset with respect to each other by 90° in rotation about the axis of the block.

Figure 6:
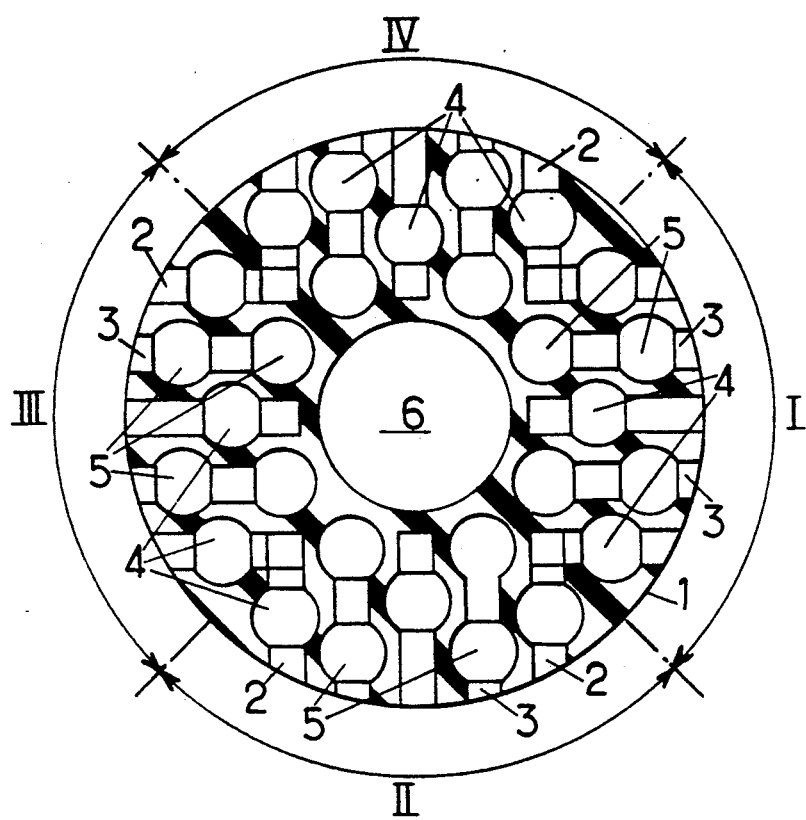
FIG. 6 is a projection of the cell assembly on a plane transversal to the axis of the block.
Figure 7:
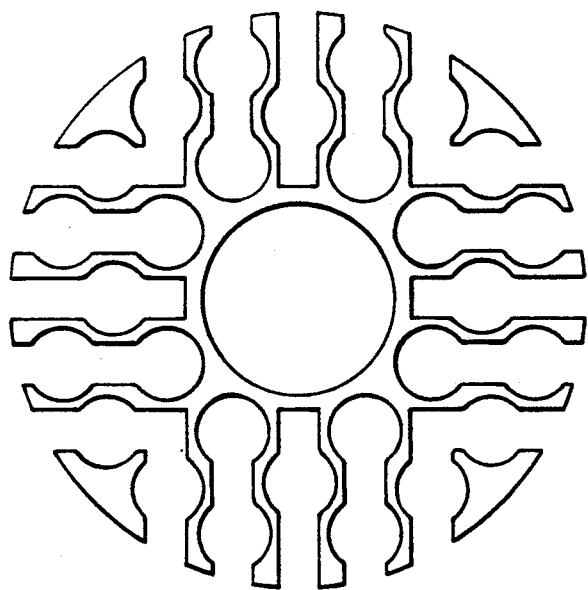
FIG. 7 is a corresponding section of FIG. 6 showing solely the projected surface of the rubber.

The view in projection of FIG. 6 shows that a judicious lateral offset between passages 2 of one layer (three in number in each of two diametrically opposite quarters of the block) and the passages 3 of the underlying layer (two in number in each of the same two quarters of the block), as well as an appropriate shift of the corresponding spherical cells 4 and 5 provides maximum mutual interleaving of these cells and leaves a minimum volume of rubber or elastomer, as is clearly shown in the sectional view of FIG. 7; cells 4 and 5 are distributed extremely homogeneously throughout the volume of block 1. It will also be appreciated that an imaginary rotation of 90° about the axis of the block of the first passages 2 would cause the imaginary positions of the first passages 2 (which are the same as a projection of an adjacent layer as shown in FIGS. 6 and 7) to mutually interpenetrate (penetrate between without touching) with the second passages 3, as shown in the quadrants in FIGS. 6 and 7 (showing the equivalent projections).

By way of information, the surface in projection of the passages and the spherical cells may be 78% of the total surface of the cross section of the block.

FIG. 6 also shows that moulding of block 1 in four quarters will be facilitated, since the block can be readily divided into four quarters I-II-III-IV for each of which, both passages 2 and passages 3 all open in the same direction. The joint planes of the mould may then be linear.

It should also be noted that with the arrangements of the invention, passages 2 and 3 are substantially shorter than those of the blocks of the prior technique described above, which will facilitate removal of the cores. For this, the cells may be not spherical, but in the form of a drop of water.

I claim:

1. A resilient alveolar block (1) for filtering vibrations, said block having a generally cylindrical shape, a longitudinal axis, and a lateral wall, said block being made from an elastic material, said block comprising in its mass a plurality of layers, each said layer having therein:

a plurality of first cells (4) disposed in respective diametrically opposite radial quadrants of said layer, respective first passages (2) extending parallel to one another and connecting associated said first cells to the lateral wall, a plurality of second cells (5) disposed in two other diametrically opposite radial quadrants of said layer, respective second passages (3) extending parallel to one another and connecting associated said second cells to the lateral wall of the block, said first and second passages being stepped in successive said layers so that said passages do not pass through each other, said block being characterized in that in any one layer, the first parallel passages which open to the lateral wall at two diametrically opposite radial quadrants of the block have a same direction, whereas the second parallel passages which open to the lateral wall of the two other diametrically opposite radial quadrants of the block have a direction perpendicular to that of the first passages.

2. A block as claimed in claim 1 wherein said first passages (2) have, with respect to said second passages (3) of a same said layer, an arrangement such that an imaginary rotation of 90° about the axis of the block would cause said first and second passages to mutually interpenetrate and would cause said first and second cells (4,5) into which said first and second passages open to be narrowly interleaved; and wherein two immediately successive layers of the block are identical as to the arrangement of said first and second passages and of said first and second cells but are offset with respect to each other in projection on a plane perpendicular to the axis by an angle of 90° through rotation about the axis of the block.

3. A block as claimed in claim 1 wherein said second cells are arranged in paris along an associated said second passage.

4. A block as claimed in claim 3 wherein said first passages (2) have, with respect to said second passages (3) of a same said layer, an arrangement such that an imaginary rotation of 90° about the axis of the block would cause said first and second passages to mutually interpenetrate and would cause said first and second cells (4,5) into which said first and second passages open to be narrowly interleaved; and wherein two immediately successive layers of the block are identical as to the arrangement of said first and second passages and of said first and second cells but are offset with respect to each other in projection on a plane perpendicular to the axis by an angle of 90° through rotation about the axis of the block.

* * * * *